United States Patent
Lai et al.

(10) Patent No.: US 6,265,355 B1
(45) Date of Patent: Jul. 24, 2001

(54) GEL-BREAKER COMPOSITION AND A METHOD FOR BREAKING A GEL

(75) Inventors: Quintin J. Lai, Anchorage, AK (US); Daniel P. Newhouse, Spring, TX (US)

(73) Assignee: Atlantic Richfield Company, Plano, TX (US)

( * ) Notice: Subject to any disclaimer, the term of this patent is extended or adjusted under 35 U.S.C. 154(b) by 0 days.

(21) Appl. No.: 09/247,479

(22) Filed: Feb. 9, 1999

(51) Int. Cl.$^7$ .................................................. C09K 3/00
(52) U.S. Cl. ..................... 507/237; 507/226; 507/227; 507/241; 507/921
(58) Field of Search ................................ 507/227, 237, 507/241, 921, 226

(56) References Cited

U.S. PATENT DOCUMENTS

| | | | |
|---|---|---|---|
| 2,842,205 | 7/1958 | Allen et al. | 166/21 |
| 2,968,572 | 1/1961 | Peeler | 106/74 |
| 3,306,756 | 2/1967 | Miller | 106/84 |
| 3,306,758 | 2/1967 | Miller | 106/84 |
| 3,449,139 | 6/1969 | Kuhn | 106/84 |
| 4,172,055 * | 10/1979 | De Martino | 507/921 |
| 4,293,340 | 10/1981 | Metz | 106/74 |
| 4,354,874 | 10/1982 | Vickers | 106/74 |
| 4,354,875 | 10/1982 | Powers et al. | 106/74 |
| 4,384,894 | 5/1983 | Vickers et al. | 106/80 |
| 4,683,949 | 8/1987 | Sydansk et al. | 166/270 |
| 4,724,906 | 2/1988 | Sydansk | 166/295 |
| 4,730,675 | 3/1988 | Wygant et al. | 166/295 |
| 4,770,245 | 9/1988 | Sydansk | 166/295 |
| 4,968,442 | 11/1990 | Falk | 252/8.551 |
| 4,986,356 | 1/1991 | Lockhart et al. | 166/300 |
| 5,002,431 | 3/1991 | Heymans et al. | 405/128 |
| 5,010,954 | 4/1991 | Falk | 166/295 |
| 5,048,609 | 9/1991 | Tackett, Jr. et al. | 166/295 |
| 5,082,057 | 1/1992 | Sydansk | 166/295 |
| 5,223,159 * | 6/1993 | Smith et al. | 507/921 |
| 5,224,546 * | 7/1993 | Smith et al. | 507/921 |
| 5,253,711 * | 10/1993 | Mondshine | 507/921 |
| 5,314,019 | 5/1994 | Honarpour | 166/270 |
| 5,338,465 | 8/1994 | Lockhart et al. | 252/8.551 |
| 5,404,951 | 4/1995 | Lai et al. | 166/295 |
| 5,497,830 * | 3/1996 | Boles et al. | 507/921 |

OTHER PUBLICATIONS

SPE/DOE 17329 "A New Conformance–Improvement–Treatment Chromium (III) Gel Technology", by R. D. Sydansk; Society of Petroleum Engineers, Inc./U.S. Department of Energy, Apr. 20, 1998.

* cited by examiner

*Primary Examiner*—Philip Tucker
(74) *Attorney, Agent, or Firm*—F. Lindsey Scott

(57) ABSTRACT

A composition containing a chelating agent and an amino carboxylic acid and a method for breaking a gel formed by a crosslinkable polymer and a crosslinking agent. The composition may also be used for selectively removing crosslinked polymer gels from an oil-bearing zone in a subterranean formation in the presence of a water formation plugged by a crosslinkable polymer and a crosslinking agent. Aqueous solutions of phosphonates and sulfonates are also useful in the method.

6 Claims, 2 Drawing Sheets

GEL-BREAKER COMPOSITION AND A METHOD FOR BREAKING A GEL

BACKGROUND OF THE INVENTION

1. Field of the Invention

This invention relates to the recovery of hydrocarbons from a subterranean formation containing oil-bearing and water-bearing zones which have been treated with crosslinkable polymer to remove the gel from the subterranean formation. Permeability may be selectively restored in the oil-bearing zones in the formation.

2. Brief Description of the Prior Art

During the recovery of hydrocarbons from subterranean formations containing oil-bearing and water-bearing zones, a number of problems are encountered. For instance, during drilling operations zones may be encountered which require the use of a crosslinked polymer to restrict the flow of fluids from the zones. Such instances can occur during drilling when high-fluid-loss zones are encountered. In such instances, a general treatment of the entire formation with a crosslinkable polymer to form a gel to shut off the flow of fluids is desirable. Such problems can be encountered in water injection wells where naturally-occurring or created fractures exist in the formation and the like. Generally speaking the use of the crosslinkable polymers is effective to plug the entire formation area. In some instances, this is desirable. In other instances it is desirable to be able to produce hydrocarbons from the oil-bearing zones of the subterranean formation when the well is completed. In such instances it is necessary to remove the plugging polymer gels from the subterranean formation.

Suitable polymer gels are crosslinked polymer gels such as described in U.S. Pat. No. 5,048,609 "Selective Permeability Reduction in a Subterranean Hydrocarbon-Bearing Formation Using a Non-Selective Gel", issued Sep. 17, 1991 to Tackett, Jr. et al, and in U.S. Pat. No. 5,338,465 "Aqueous Gelable Composition With Delayed Gelling Time", issued Aug. 16, 1994 to Lockhart et al. Both these patents are hereby incorporated in their entirety by reference. Generally, the crosslinkable polymer is a carboxylate-containing polymer such as an acrylamide-containing polymer and the like. Of the acrylamide-containing polymers the most preferred are polyacrylamide, partially hydrolyzed polyacrylamide, copolymers of acrylamide and acrylate, and carboxylate-containing terpolymers of acrylate. The polyacrylamide most useful in such applications has from about 0.1 percent to about 3 percent of its amide groups hydrolyzed. The crosslinking agent affects crosslinking between the carboxylate sites of the same or different polymer molecules within the gel. The crosslinking agent is preferably a molecule or complex containing a reactive transition metal cation. Exemplary crosslinking agents are compounds or complexes containing chromium acetate, chromium chloride, aluminum compounds, zirconium compounds, iron compounds and the like. Such polymers and crosslinking agents are considered to be well-known to those skilled in the art. These polymers, with a suitable amount of a crosslinking agent are typically prepared as an aqueous solution and injected into the subterranean formation. The aqueous solution containing the polymer and crosslinker is then allowed to react to form a gel in the formation.

The various categories of gel strength are defined in U.S. Pat. No. 4,770,245, issued Sep. 13, 1988 to Sydansk. This reference is hereby incorporated in its entirety by reference. The gels may vary from highly viscous to substantially solid or ringing gels.

When such gels are positioned in a formation it is desirable, in some instances, to remove all or part of the gel from the formation. Most commonly it is desired to remove the gel from the oil-bearing zones of the formation while leaving the water-bearing zones of the formation plugged.

Previously, gels have been removed from subterranean formations by the use of strong oxidizing materials which are less effective than other agents which may be used to break the gel by chelating or otherwise reacting with the crosslinking agent. Various materials have been proposed for use as chelating agents, but all are attended by certain drawbacks such as, for instance in the use of EDTA (ethylenediaminetetraacetic acid), it has been found that EDTA is effective with the substantially solid ringing gels but works poorly with the viscous gels typically formed by the higher molecular weight polymers. Various of the other chelating agents have been found to leave precipitates of the gel in the formation after breaking.

It is desirable that an improved composition be available for breaking such gels which may be used to break the gels so that they are removed from the formation without leaving a residue and so that the gels may be selectively broken in oil-bearing zones while leaving the water-bearing zones plugged.

Unless otherwise stated, all references to percentages (%) are to weight percent.

SUMMARY OF THE INVENTION

According to the present invention crosslinked polymer gels are readily broken using a gel-breaker composition consisting essentially of an aqueous solution containing from about 0.01 to about 25% of the composition of a chelating agent selected from the group consisting of phosphonic acids containing up to 8 phosphonate groups and derivatives thereof, and sulfonic acids and derivatives thereof, and from about 0.01 to about 8.0% an amino carboxylic acid containing from 1 to 5 carboxyl groups and containing from 2 to about 6 carbon atoms and derivatives thereof.

The invention further comprises a method for breaking a crosslinked polymer gel in a subterranean formation penetrated by a wellbore by injecting an aqueous solution containing from about 0.01 to about 25% of the aqueous solution of a chelating agent selected from the group consisting of phosphonic acids containing up to 8 phosphonate groups and derivatives thereof, and sulfonic acids and derivatives thereof, or the composition, into the subterranean formation through the wellbore, and maintaining the aqueous solution in contact with the crosslinked polymer gel for a sufficient time for the chelating agent to break at least a major portion of the crosslinked polymer gel.

The present invention further comprises a method for selectively increasing the permeability of an oil-bearing zone in a subterranean formation penetrated from a surface by a wellbore and containing at least one oil-bearing zone and at least one water-bearing zone which has been treated by injection of an aqueous polymer and a crosslinking agent to position a crosslinked polymer gel in the oil-bearing zone extending a first distance radially outward from the wellbore and in the water-bearing zone extending a second distance, the second distance being greater than the first distance, radially outward from the wellbore, the method consisting essentially of injecting an aqueous solution containing from about 0.01 to about 25% based upon the aqueous solution of a chelating agent selected from phosphonic acids containing up to 8 phosphonate groups and derivatives thereof, and sulfonic acids and derivatives thereof, or the composition, into the subterranean formation through the wellbore in an amount sufficient to break the crosslinked polymer gel in the subterranean formation around the wellbore to a distance at least equal to the first distance, but less than the second distance outwardly from the wellbore, maintaining the aqueous solution in contact with the subterranean formation for a sufficient time to break the crosslinked polymer gel outwardly to at least the first distance, and producing fluids at an increased rate from the oil-bearing zone.

DESCRIPTION OF THE PREFERRED EMBODIMENTS

Figure 1:
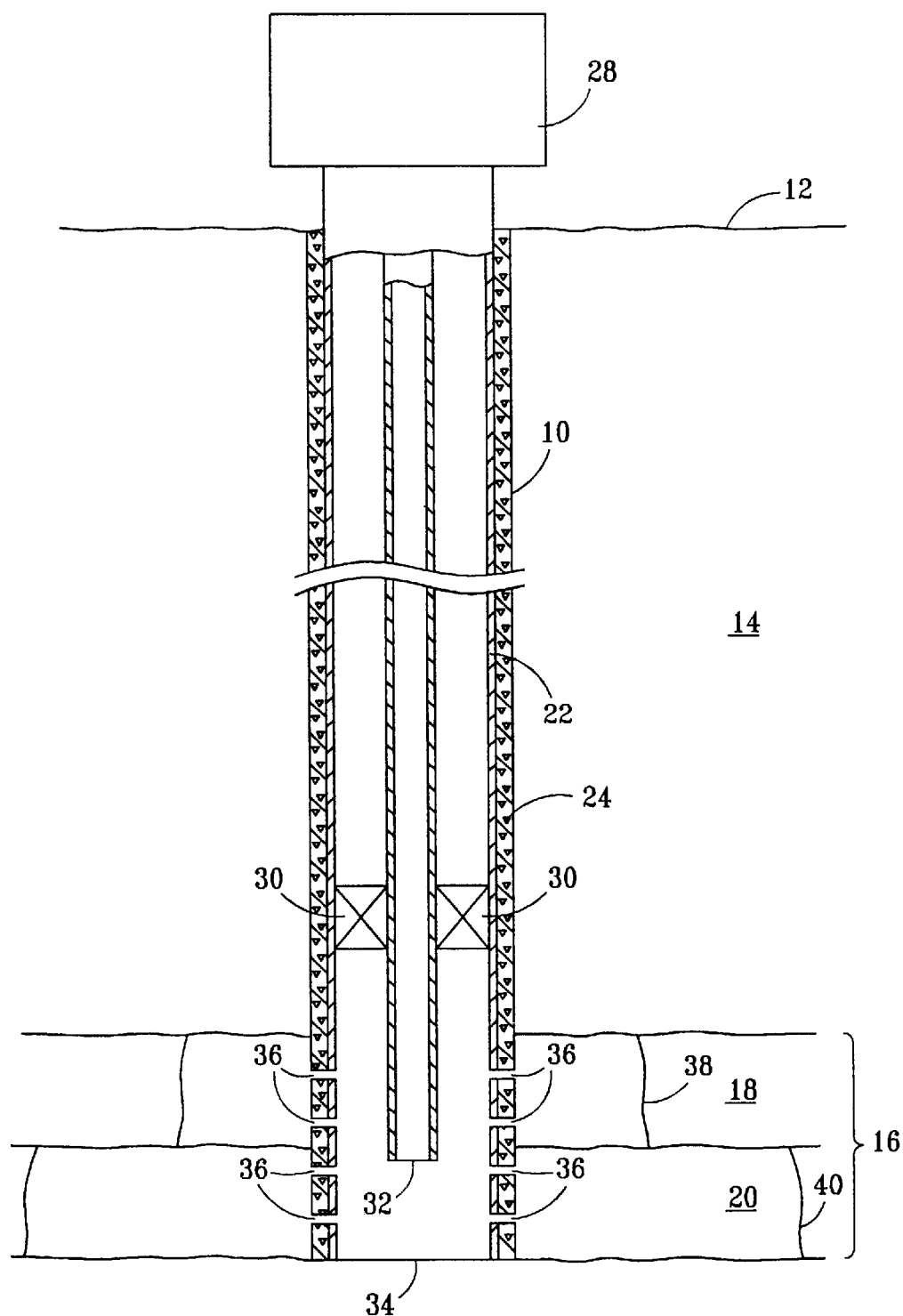
FIG. 1 is a schematic of an oil well penetrating a subterranean formation wherein the method of the present invention is useful.
Figure 3:
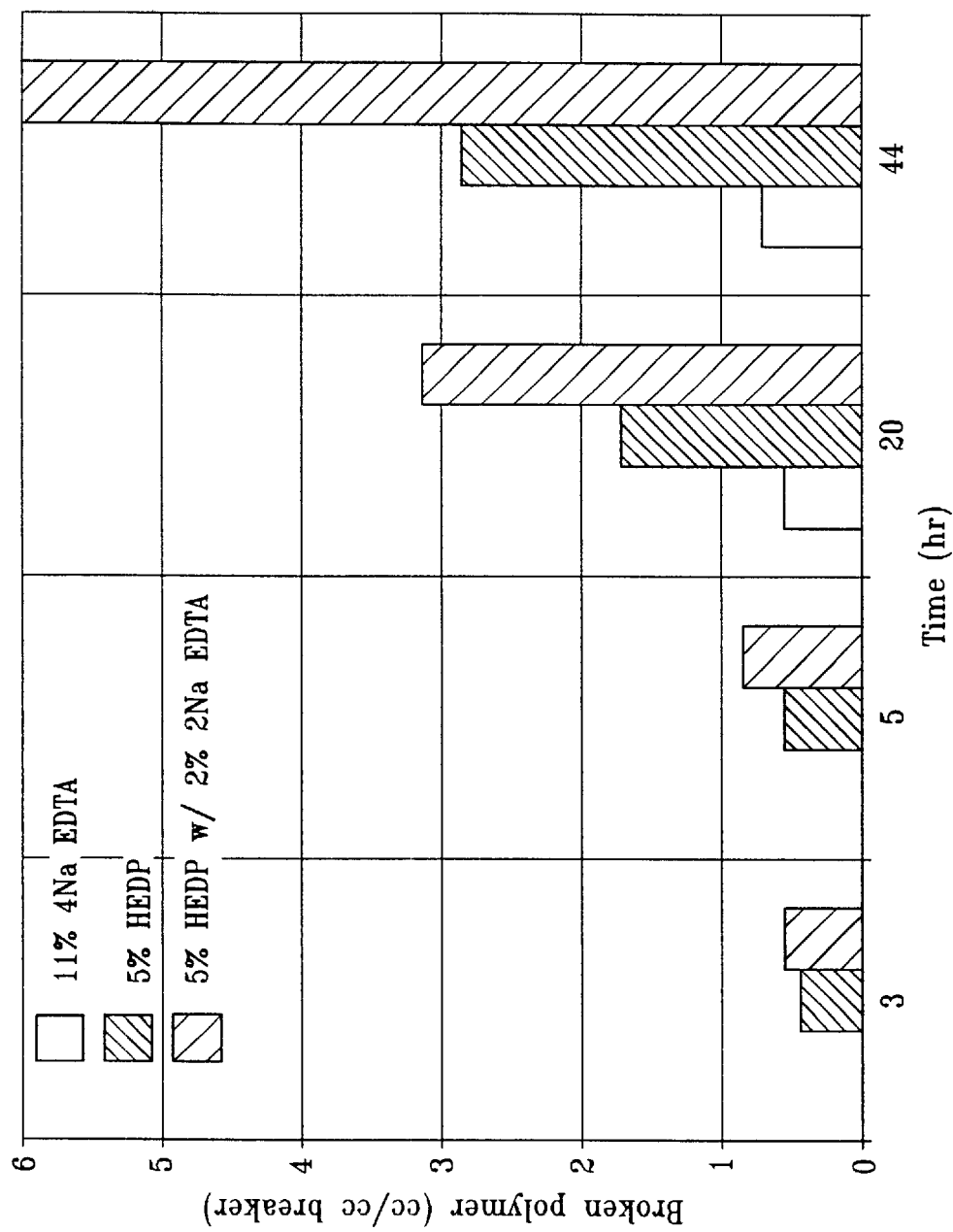
FIG. 3 is a graph showing the test results from Example 2.

The present invention comprises a gel-breaker composition for breaking a gel formed by a crosslinkable polymer and a crosslinking agent, the composition consisting essentially of an aqueous solution containing from about 0.01 to about 25% of the composition of a chelating agent selected from the group consisting of phosphonic acids containing up to 8 phosphonate groups and derivatives thereof, and sulfonic acids and derivatives thereof, and from about 0.01 to about 8.0% of an amino carboxylic acid containing from 1 to 5 carboxyl groups and containing from 2 to about 6 carbon atoms and derivatives thereof.

In the composition, a chelating agent selected from phosphonic acids and sulfonic acids is used in combination with an aminocarboxylic acid to achieve complete removal of the crosslinked polymer and crosslinked polymer precipitate from a subterranean formation. Either the phosphonic compounds or the sulfonic acid compounds can be used alone, but in some instances will leave precipitates in the formation which are not produced with fluids from the formation after the breaker treatment. Similarly, the aminocarboxylic acids tend to be effective with ringing gel or solid gel deposits but are less effective with the highly viscous, more plastic gels formed by higher molecular weight polymers. In combination, however, these materials effectively remove substantially all of the gel from the subterranean formation.

While a wide range of phosphonic acids may be used, some suitable phosphonic acids are aminotri (methylenephosphonic acid), 1-hydroxyethylidene-1,1-diphosphonic acid, ethylenediaminetetra (methylenephosphonic acid), hexamethylenediaminetetra (methylenephosphonic acid), diethylenetriaminepenta (methylenephosphonic acid), triethylenetetramine hexa (methylenephosphonic acid), phosphino polycarboxylic acid and phosphinomethylated polyamine and the like.

Similarly, a wide range of sulfonates are useful. Some particular suitable sulfonates are sulfonated polyacrylic acid copolymer and polyvinylsulfonate.

The aminocarboxylic acid is selected from the group consisting of ethylenediamine tetra acetic acid (EDTA), disodiumethylenediamine tetra acetic acid, nitriloacetic acid, and the like.

The chelating agent is present in the composition in an amount equal to from about 0.01 to about 25.0% based upon the weight of the composition and, even more preferably, from about 1.0 to about 20.0% based upon the weight of the composition.

The aminocarboxylic acid is preferably present in an amount from about 0.01 to about 8.0% based upon the weight of the composition and, even more preferably, from about 1.0 to about 6.0% based upon the weight of the composition.

The composition may be used for breaking a crosslinked polymer gel in a subterranean formation penetrated by a wellbore by injecting the composition into the subterranean formation through the wellbore, and maintaining the composition in contact with the crosslinked polymer gel for a sufficient time for the chelating agent to break at least a major portion of the crosslinked polymer gel. Typically, the pH of the composition is from about 1 to about 13, preferably from about 3 to about 10, and more preferably from about 4 to about 7.

The composition is typically injected in an amount sufficient to react with the amount of gel contained in the formation and maintained in contact with the formation for a sufficient time for the chelating agent to react with at least a major portion of the crosslinking agent to break the crosslinked polymer gel. The broken gel is returned to its fluid state prior to crosslinking. The gel is then readily removed from the subterranean formation by simply producing fluids from the formation. This method is effective to remove substantially all of the gel from a subterranean formation and can be used to remove gel from a wellbore or from the formation surrounding a wellbore. The reaction time for removing the gel will vary substantially depending upon whether the gel is present as a gel plug in the wellbore or in the formation surrounding the wellbore, or both. The amount of time required to remove the gel is readily determined by those skilled in the art as is the amount of composition necessary to chelate with the crosslinking material. Typically, such times are at least about 24 hours.

In many instances, it is desirable to selectively increase the permeability of oil-bearing zones in a subterranean formation which has been treated with a crosslinkable polymer gel to shut off all fluid flow from the subterranean formation. Such formations are readily treated to selectively increase the permeability of an oil-bearing zone in a subterranean formation penetrated from a surface by a wellbore and containing at least one oil-bearing zone and at least one water-bearing zone which has been treated by injection of an aqueous polymer and a crosslinking agent to position a crosslinked polymer gel in the oil-bearing zone extending a first distance radially outward from the wellbore and in the water-bearing zone extending a second distance, which is greater than the first distance, radially outward from the wellbore, the method consisting essentially of injecting the composition into the subterranean formation through the wellbore in an amount sufficient to break the crosslinked polymer gel in the subterranean formation and around the wellbore to a distance at least equal to the first distance, but less than the second distance outwardly from the wellbore, maintaining the composition in contact with the subterranean formation for a sufficient time to break the crosslinked polymer gel outwardly to at least the first distance, and producing fluids at an increased rate from the oil-bearing zone.

In the treatment of such formations the polymer and crosslinker are typically supplied in an aqueous solution and, as a result, the polymer is positioned to a much greater depth in the water-bearing zones of the formation than in the oil-bearing zones of the formation. There may be a similar difference in the depth of positioning of the gel between low and high permeability zones of the formation. The primary criteria, however, determining the depth of penetration of the aqueous polymer solution into most of the zones are based upon the oil saturation of the zone and the relative permeability of the zone to oil or brine.

In the methods of the present invention discussed above, an aqueous solution containing from about 0.01 to about 25% based upon the aqueous solution of a chelating agent selected from phosphonic acids containing up to 8 phosphonate groups and derivatives thereof, and sulfonic acids and derivatives thereof, may be used. Such aqueous solutions are effective where the crosslinked polymer gel removed does not leave a precipitate or where the precipitate can be tolerated. In such instances, the aqueous solution is useful in the methods described above by reference to the composition.

By reference to FIG. 1 a wellbore 10 is positioned to extend from a surface 12 through an overburden 14 to a subterranean formation 16. Subterranean formation 16 includes an oil-bearing zone 18 and a water-bearing zone 20. Wellbore 10 is cased with a casing 22 cemented in place by cement 24 to a bottom 34 of wellbore 10. Wellbore 10 includes a tubing 26 inside casing 22 with tubing 26 and casing 22 being connected to a wellhead 28 for the injection and removal of fluids from wellbore 10. A packer 30 is positioned between tubing 26 and casing 22. A lower end 32 of tubing 26 extends into the vicinity of perforations 36 which provide fluid communication between oil-bearing zone 18 and water-bearing zone 20 and tubing 26. In the treatment of wellbore 10 an aqueous solution containing polymer and a crosslinker are injected through tubing 26 into wellbore 10 and maintained at a suitable pressure for a selected time period to position the aqueous polymer solution in oil-bearing zone 18 to a first distance 38 outwardly into the formation 16 from wellbore 10. Similarly, the aqueous solution penetrates water-bearing zone 20 to a distance 40 radially outwardly from wellbore 10. The difference in penetration is attributable primarily to the fact that oil-bearing zone 18 is usually of a lower permeability and a different phase and does not accept the aqueous polymer solution as readily as the water-bearing zone 20 which is more receptive to the water-based polymer solution.

After the polymer gel solution has been injected, an aqueous solution may be injected through tubing 26 to push the aqueous polymer solution out of the area in wellbore 10 below packer 30 or, alternatively, a small amount of breaker solution may be used after treatment to remove any gel from this area.

As so treated, subterranean formation 16 is uniformly plugged with the gel with respect to permeability at the outer diameter of wellbore 10.

When an aqueous breaker solution is injected into wellbore 10 after gelation, the formation presents substantially the same resistance to penetration by the breaker solution in both oil-bearing zone 18 and water-bearing zone 20 because of the presence of the polymer gel. When it is desired to remove the polymer from the oil-bearing zone, but not the water-bearing zone, a sufficient amount of polymer is injected to dissolve the polymer radially outward into the formation from wellbore 10 for a distance at least equal to the distance 38 but less than the distance 40. This may be accomplished by determining the amount of gel to be dissolved and adding the required amount of breaker by maintaining a breaker solution in the formation for a selected period of time to remove the desired amount of gel and the like. Either the composition or an aqueous solution of phosphonate or sulfonate described above may be used.

The breaker composition of the present invention is extremely effective in removing the gel in a predictable fashion because of the use of the two breaker materials in combination to effectively break the polymer gel so that it can be readily recovered from the zones of interest by the production of fluids therefrom.

The rates at which a given gel is dissolved by a given breaker are readily determined by those skilled in the art.

The effectiveness of the composition of the present invention by contrast to EDTA alone, or the phosphonate or sulfonate materials alone, has been demonstrated below in Example 1.

EXAMPLE 1

Figure 2:
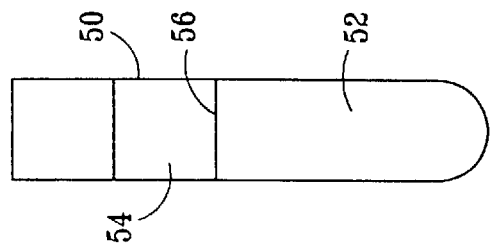
FIG. 2 is a schematic of the test apparatus discussed in Example 1.

In FIG. 2, a test apparatus comprising a tube 50 which is adapted to the positioning of a polymer in a zone 52 in a lower portion of the tube and a breaker solution in a zone 54 above the gel is shown. In the test performed, a polymer gel was produced by positioning 30 cc of an aqueous solution (2% KCl) containing 5% of a polyacrylamide having an average molecular weight of about 250,000 and a trivalent chrome cross-linker, supplied in the form of chromium triacetate, in tube 50 to produce a gel in zone 52 to a height 56 equal to 2⅝ inches in tube 50. This gel was allowed to harden for 24 hours at 200° F. A 5 cc portion of the breaker composition was then placed in tube 50 in zone 54. Various breaker compositions were tested by leaving aqueous solutions of the breakers in contact with the polymer gel at 200° F. for extended periods of time and measuring the depth to which the polymer has been de-gelled. The test results for various breakers are shown in Table 1.

TABLE 1

| | Time (days) | | | | | |
|---|---|---|---|---|---|---|
| Chelating Agent | 1 | 2 | 4 | 6 | 8 | Observations |
| 5 wt % disodium EDTA | ⅝ | ⅞ | 1½ | 1¾ | 1⅞ | |
| 5 wt % nitrilotriacetic acid | ⅝ | ⅞ | 1½ | 1¾ | 2 | |
| 10 wt % citric acid | 1¼ | 1⅞ | all | | | |
| 10 wt % tetrasodium EDTA | 1½ | 2 | all | | | broken gel more viscous than the aqueous polymer cloudy |
| 10 wt % HEDP* | 2⅛ | all | | | | |
| 10 wt % malonic acid | 1⅛ | 1½ | 1¾ | 2⅛ | 2¼ | |
| 10 wt % pentasodium ETPA** | ⅝ | 2⅜ | all | | | broken gel more viscous than the aqueous polymer precipitate |
| 10 wt % HEDP + 5 wt % malonic acid | 2⅜ | all | | | | |
| 5 wt % HEDP + 2% 2Na EDTA | 1¼ | 1¾ | all | | | |
| 5 wt % HEDP | ⅞ | 1¼ | 1½ | 2 | 2⅛ | |

*hexamethylenediaminetetra (methylenephosphonic acid)
**diethylenetriaminepentaaceticacidpentasodium salt.

Upon review of the test in Table 1, it is observed that in some instances precipitates are left in tube 50 after the breaker has substantially broken the gel. The combination of the sodium and phosphonate materials with the aminocarboxylic acid shows that the combination of materials is more effective in substantially breaking the polymer without a remaining precipitate than are either of the materials alone.

In Table 1 the chelating agents tested are shown by the weight percent of the chelating agent in an aqueous solution. The test times are shown in days and the numbers represent the number of inches of polymer gel broken during the time shown by each of the chelating agent solutions.

It is believed that Table 1 fully shows that the composition of the present invention is more effective than the use of either the phosphonates, sulfonates or aminocarboxylic acids alone.

EXAMPLE 2

A high molecular weight gel solution was prepared by adding 6000 ppm of a high molecular weight polymer supplied as 935S by Allied Colloids, Inc. to a 2% KCl solution. A gel was produced by placing a quantity of the solution and a trivalent ion cross-linker, supplied in the form of chromium triacetate, in the test apparatus of Example 1 and heating the solution at 200° F. for 24 hours to form a gel. The gel was then tested by adding 5 cc of a solution containing 11% 4 Na EDTA in deionized water, a second solution containing 5% HEDP in deionized water and a third solution containing 5% HEDP and 2% 2 Na EDTA in deionized water were added to three batches of gel produced as described above. The test results are shown in FIG. 1 as a function of time.

The 4 Na EDTA showed no gel breakage until the 20-hour reading. The HEDP showed some gel breakage beginning at the 3-hour reading and increasing through the 44-hour reading. The gel breakage by the combination of 2 Na EDTA and HEDP is greater than either the 11% 4 Na EDTA alone or the HEDP alone. At the 44-hour readings, the gel breakage by the combination is significantly greater than the combined gel breakage by the other two breaker solutions.

EXAMPLE 3

A 6000 ppm polymer solution was prepared by adding 3.6 g of a high-molecular-weight polymer marketed as 935S polymer by Allied Colloids, Inc. to 596.4 g of sea water. The solution was stirred for two minutes on a stir plate and placed in a shaker overnight. A 375 g sample of the resulting polymer solution was placed in a 500 cc bottle and mixed with 250 microliters of chromium triacetate and heated at 200° F. for four hours to form a gel. A 60 cc sample of a first breaker solution consisting of 5% HEDP in deionized water was placed in the bottle with the gel and allowed to set for four days at 200° F. This breaker solution broke about 63.8% of the gel.

A second test was run in the same way using a combination of 5% HEDP and 2% 2 Na EDTA in deionized water. The combination breaker solution broke all of the gel.

Viscosity and other data for the polymer solution and the first and second tests are shown below in Table 2. The viscosities were determined with a Brookfield viscometer at the speeds shown. The first test broken polymer liquid layer had a creamy green appearance, indicating the presence of dispersed particulates in the broken polymer liquid layer.

TABLE 2

| | Viscosity (cp) | | | |
|---|---|---|---|---|
| SPEED rpm | polymer solution | polymer solution & breaker | Test 1 liquid | Test 2 liquid |
| 60 | 52.2 | 30.9 | 37.3 | 32.0 |
| 30 | 57.1 | 31.1 | 40.7 | 32.5 |
| 12 | 60.6 | 32.5 | 45.2 | 34.0 |
| 6 | 62.6 | 33.1 | 48.5 | 35.0 |

The lower viscosities for Test 2 are indicative of the complete gel breakage.

The combination of the HEDP (phosphonic acid) and the 2 Na EDTA (aminocarboxylic acid) has been shown to be more effective as a breaker than the HEDP alone. The combination of the breakers resulted in greater breaker efficiency and a lower viscosity in the mixture of breaker solution and broken polymer.

Having thus described the present invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A gel breaker composition for breaking a gel deposit, positioned in a subterraneous formation and formed by a cross-linkable polymer and a cross-linking agent, the composition consisting essentially of a aqueous solution containing from about 0.01 to about 25 weight percent of the composition of a chelating agent consisting of at least one of phosphonic acids containing at least 3 phosphonate groups and selected from the group consisting of aminotri (methylenephosphonic acid), 1-hydroxyethylidene-1,1-diphosphonic acid, ethylenediaminetetra (methylenephosphonic acid), hexamethylenediaminetetra (methylenephosphonic acid), diethylenetriaminepenta (methylenephosphonic acid) and triethylenetetramine hexa (methylenephosphonic acid), and phosphino polycarboxylic acid and phosphinomethylated polyamine and from about 0.01 to about 8.0 weight percent of at least one of ethylenediaminetetraacetic acid, disodium ethylene diaminetetraacetic acid, nitriloacetic acid, tetrasodium ethylenediaminetetraacetic acid and diethylenetriaminepentaacetic acid pentasodium salt.

2. A gel breaker composition for breaking a gel formed by a cross-linkable polymer and a cross-linking agent, the composition consisting essentially of an aqueous solution containing from about 0.01 to about 25 weight percent of a composition of a chelating agent selected from the group consisting of sulfonated polyacrylic acid copolymer and polyvinyl sulphonate and from about 0.01 to about 8.0 weight percent of an amino carboxylic acid containing from 1 to 5 carboxyl groups and containing from 2 to about 6 carbon atoms and salts thereof.

3. The composition of claim 2 wherein the amino carboxylic acid is present as a sodium salt.

4. The composition of claim 2 wherein the amino carboxylic acid is diethylenetriaminepentaaceticacidpentasodium salt.

5. A gel breaker composition for breaking a gel deposit, positioned in a subterraneous formation and formed by a cross-linkable polymer and a cross-linking agent, the composition consisting essentially of a aqueous solution containing from about 0.01 to about 25 weight percent of hexamethylenediamine tetra(methylphosphonic acid) and from about 0.01 to about 8.0 weight percent of malonic acid.

6. A gel breaker composition for breaking a gel deposit, positioned in a subterraneous formation and formed by a cross-linkable polymer and a cross-linking agent the composition consisting essentially of a aqueous solution containing from about 0.01 to about 25 weight percent of hexamethylenediamine tetra(methylphosphonic acid) and from about 0.01 to about 8.0 weight percent of disodium ethylenediaminetetraacetic acid.

* * * * *